United States Patent [19]

Horiuchi et al.

[11] 4,193,572

[45] Mar. 18, 1980

[54] HOLDER FOR HOLDING TEMPERATURE DETECTING DEVICE EMPLOYED IN MICROWAVE OVENS

[75] Inventors: Masao Horiuchi, Tenri; Yasuyuki Motozuka, Kashiwara, both of Japan

[73] Assignee: Matsushita Electric Industrial Co., Ltd., Osaka, Japan

[21] Appl. No.: 794,653

[22] Filed: May 6, 1977

[30] Foreign Application Priority Data

May 12, 1976 [JP] Japan .................................. 51/54635

[51] Int. Cl.² ............................................. F16M 13/00
[52] U.S. Cl. .................................. 248/535; 248/226.5
[58] Field of Search ................... 248/37.3, 37.6, 207, 248/229, 514, 535, 538, 539, 226.5

[56] References Cited

U.S. PATENT DOCUMENTS

| | | | |
|---|---|---|---|
| 503,338 | 8/1893 | Woods | 248/535 X |
| 975,858 | 11/1910 | Guy | 248/37.3 |
| 1,203,937 | 11/1976 | Surface | 248/514 X |
| 2,430,161 | 11/1947 | Csencsics | 248/226.4 |
| 2,590,286 | 3/1952 | Wirtanen et al. | 248/37.6 |
| 2,597,275 | 5/1952 | Ahlstrand | 248/37.6 |
| 2,906,124 | 9/1959 | Chaney | 248/37.6 X |
| 3,029,058 | 4/1962 | Himler | 248/514 X |
| 3,368,518 | 2/1968 | Anthony | 248/535 X |

Primary Examiner—William H. Schultz
Attorney, Agent, or Firm—Wenderoth, Lind & Ponack

[57] ABSTRACT

A holder of the present disclosure is detachably mounted on a container of an object to be heated for releasably holding a temperature detecting device employed in an oven for detecting the temperature of the object during heating. The holder is made of material having low dielectric loss and includes a body, a pair of arm members extending from one side of the body for holding the temperature detecting device and a pair of leg members extending from approximately either side of the body for clamping the rim of the container between the leg members by elastic force of the leg members.

11 Claims, 15 Drawing Figures

HOLDER FOR HOLDING TEMPERATURE DETECTING DEVICE EMPLOYED IN MICROWAVE OVENS

The present invention relates to a high frequency heating apparatus, and more particularly, to a microwave oven or electric oven equipped with a device for detecting the temperature of an object being heated.

BACKGROUND OF THE INVENTION

In heating objects or materials such as meat and the like whose taste is much affected by its heating temperature, or in heating a comparatively large amount of material in a microwave oven, it is necessary to detect the heating temperature of these materials being heated. For this and other reasons, in some prior art microwave ovens, a temperature detecting device is provided in the oven.

One of the most commonly used temperature detecting devices includes a probe or temperature detector which is of a comparatively thin needle shape and has a thermal sensitive member incorporated therein, a handle which is comparatively large in size for facilitating easy holding thereof by an operator, a cable for transmitting a detected temperature signal to a control unit provided outside the heating cavity of the microwave oven, and a flexible member extending from the handle to any wall of the heating cavity. To carry out the detection of the temperature of the objects or materials being heated, the operator holds the temperature detecting device and inserts the probe into the object to be heated. A temperature signal is then continuously transmitted towards the control unit.

In order to detect the temperature of the object with accuracy and also in order to facilitate the insertion of the probe into the object, the probe of the above described type is comparatively small in size and has a heat capacity which is as small as possible, that is, the probe is designed to have as small a mass as possible. On the other hand, the handle as well as the cable of the detecting device are not necessarily formed as such a small size, and are preferably a comparatively large size for easy holding. Therefore, the temperature detecting device of the conventional type has its weight mostly occupied by the handle. This being the case, the detecting device is apt to lose its balance during the use thereof.

Accordingly, there has been a disadvantage in conventional temperature detecting devices of the above described type, because the temperature detecting device may fall from the inserted position or may not possibly be used with objects which are liquid or of comparatively small size. When the detecting device is improperly used for detecting the temperature of liquid and falls from the container, an undesirable arc may be produced between the probe, which is made of metal, and the wall of the heating cavity upon contact therebetween. The probe, especially the thermal sensitive member, and the wall of the cavity may thereby be accidentally damaged.

Another known type of the temperature detecting device is not provided with the cable, but has a gauge for directly indicating the temperature of the object. This type of detecting device, nevertheless, still has disadvantages similar to those described above.

SUMMARY OF THE INVENTION

Accordingly, it is a primary object of the present invention to provide a holder for fixedly holding a probe of a temperature detecting device onto a container containing an object to be heated during heating of the object in microwave ovens so as to carry out detection of temperatures at a desired portion of the object with high accuracy.

It is another object of the present invention to provide a holder of the above described type which is readily mounted on or detached from the container.

It is yet another object of the present invention to provide a holder of the above described type which will not adversely affect an electric and/or magnetic field formed in the heating cavity of the microwave so that the electric and/or magnetic field therein will not be disturbed and so that the holder will not produce any heat.

It is a further object of the present invention to provide a holder of the above described type which is capable of adjusting the holding angle of the probe, so that the probe may be directed and inserted into the object at a desired angle, regardless of the shape of the container.

It is still a further object of the present invention to provide a holder of the above described type which is capable of holding probes of different sizes, that is, probes with different diameters.

In order to accomplish these and other objects, according to the present invention, there is a detachable holder, directly related to the invention, between the temperature detecting device and the container. The holder is made of insulating material, such as synthetic resin, and comprises a body, a first portion extending from one end of the body for holding the probe and a second portion extending from the end approximately opposite the first end of the body for holding onto the container. The first portion, the probe holding portion, includes two elastic arms each having at least one curved recess. The curved recess in one arm directly faces a similar recess formed in the other arm, so that the probe can be fixedly held between the two arms between the opposed recesses. The second portion, the container holding portion, includes at least two elastic legs which are separated from each other at a common joint on the body and are narrowed towards the end portions thereof. The tip ends of the legs are spaced apart from each other a predetermined distance for easy opening of the legs when it is desired to clamp the holder onto the rim of the container.

For the purpose of adjusting the holding angle of the probe, the probe holding portion may be pivotally connected to the body for effecting a pivotal movement of the probe holding portion with respect to the body, or an additional pair of opposed curved recesses may be formed other than those described above for holding the probe at different angles.

For the purpose of holding the probes of different sizes, the recesses may be formed in different sizes.

BRIEF DESCRIPTION OF THE DRAWINGS

These and other objects and features of the present invention will become apparent from the following descriptions taken in conjunction with preferred embodiments thereof with reference to the accompanying drawings, in which; member. When opposed

DETAILED DESCRIPTION OF THE INVENTION

Figure 1:
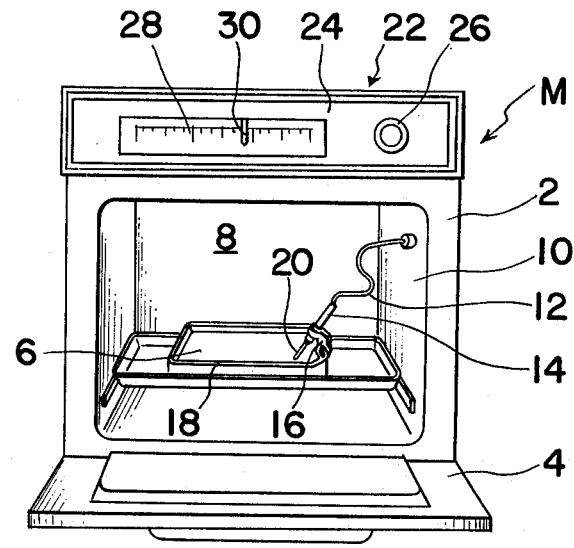
FIG. 1 is a perspective front view of a microwave oven provided with a temperature detecting device which is held by a holder of a present invention onto the container.

Before the description of the present invention proceeds, it should be noted that like parts are designated by like reference numerals throughout the accompanying drawings.

Referring first to FIG. 1, a microwave oven M comprises an outer casing 2 of cubic, box-like shape, and a door member 4 hingedly connected to the bottom edge of the casing 2 for opening the casing 2 to insert an object 6, such as food items, into a heating cavity 8 inside the casing 2 and for closing the casing 2 to close the heating cavity 8 created by an inner wall 10 of the casing 2 and the door member 4. The object 6 described as food items may be any item and may be presented in any form, and may be either liquid or solid such as in liquid form or in solid form. The object 6 shown in FIG. 1 is liquid. Extending from the inner sidewall 10, is a cable 12 connected to a temperature detecting device 14. The temperature detecting device 14 is fixedly connected by a holder member 16 of the present invention to the rim of a container 18 which contains the object 6. The end portion of the temperature detecting device, the probe 20, has its tip end inserted into the object 6. The relation between the holder member 16 and the temperature detecting device 14 and also the relation between the holder member 16 and the container 18 is described in detail later.

Provided above the heating cavity 8 is a control section 22 having a control panel 24 in which a dial 26 and a scale 28 having an indicator 30 are provided. Upon turning the dial 26, the indicator 30, slides along the scale 28 for prearranging the desired temperature of the heated object. When the temperature of the object 6 being heated reaches the desired temperature, a control unit (not shown) provided in the control section 22 automatically turns off the microwave oven to stop heating the object 6. It is to be noted that the microwave oven described above is further provided with switch arrangements and timer arrangements which are necessary to proceed the heating operation. Since such arrangements are not directly concerned with the present invention, further description thereof is omitted.

Figure 2:
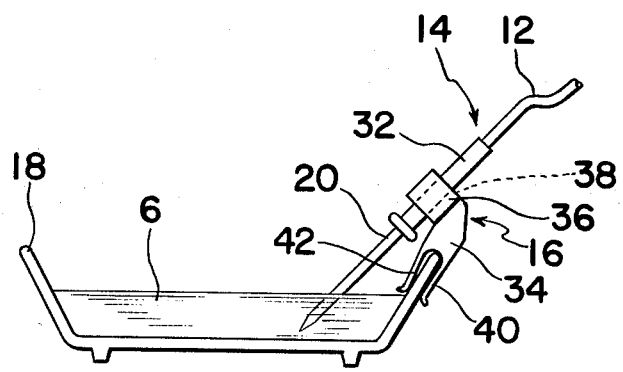
FIG. 2 is a cross sectional view of the container particularly showing a manner in which the temperature detecting device is held onto the container by the holder.

Referring now to FIG. 2, details of the relationship between the holder member 16 and the temperature detecting device 14 are shown, as well as the relationship between the holder member 16 and the container 18.

The temperature detecting device 14 comprises the probe 20 of needle-like shape having a thermal sensitive member (not shown) therein and a cylindrical support 32 having one end connected to the probe 20 and the opposite end connected to the cable 12, which in turn is connected to the wall 10. The probe 20, whose tip end is inserted into the object 6, is made of material with low heat capacity, such as metal, while the support is made of material with high heat capacity, such as synthetic resin.

Figure 3A:
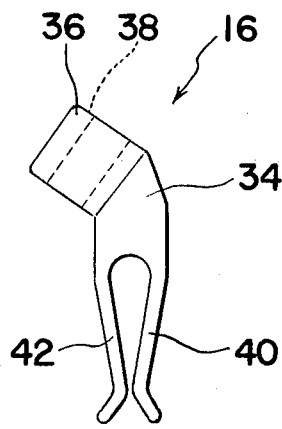
FIGS. 3(a) and 3(b) are side and front elevational views of the holder of the present invention.
Figure 3B:
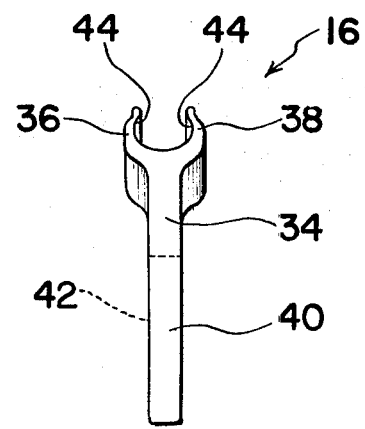

Referring to FIGS. 3(a) and 3(b), the holder member 16 for holding the temperature detecting device 14 fixedly onto the container 18 includes a body 34, a pair of elastic arm members 36 and 38 extending from one end of this body 34 for holding the temperature detecting device 14 and a pair of elastic leg members 40 and 42 extending from the opposite end of the body 34 for holding onto the container 18. Each of the elastic arm members 36 and 38, as clearly shown in FIG. 3(b), has a curved recess 44 formed in the surface facing the other arm member when viewed from the top, the elastic arm members 36 and 38 form a shape resembling a horse-shoe. In order to position the temperature detecting device 14 inside the holder member 16, the cylindrical support 32 is forcibly inserted between the two arm members 36 and 38 and is, thus, tightly held between these two arm members in the opposed curved recesses 44. Since the elastic arm members 36 and 38, when holding the support 32, are urged towards each other and the opposed recesses 44 closely engage the surface of the cylindrical support 32, the temperature detecting device is fixedly held in position by the holder member 16.

The elastic leg members 40 and 42 are each the same length and are integrally or fixedly formed with the body 34. The leg members separate from each other at a joint of the leg members 40 and 42 to the body 34 and are narrowed towards the end portion of the leg members. The tip end of the leg members 40 and 42 are spaced apart from each other in a predetermined distance for easy opening of the legs when it is desired to clamp the holder member 16 onto the rim of the container 18. In order to position the holder member onto the container 18, the rim of the container 18 is forcibly inserted between the two leg members 40 and 42 and is, thus, tightly positioned between the two leg members 40 and 42. Since the elastic leg members 40 and 42, when holding the rim of the container 18, are urged towards each other, the end portion of the leg members 40 and 42, especially where the space therebetween is narrowed, tightly clamps the rim of the container 18. Thus, the holder member 16 is firmly held in position with respect to the container 18.

Accordingly, the temperature detecting device 14 is maintained in a predetermined position with respect to the container 18 by the holder member 16.

Since the holder member 16 has the joint of the leg member spaced apart from each other in a comparatively wide space, it is possible to apply the holder member 16 to any type of container 18, whether it has a thick edge and/or rim or not, and also, it is possible to position the holder member 16 any where along the edge of the container to selecting an optimum position for the temperature detecting device to be inserted into the object 6.

Therefore, there is no possibility that the temperature detecting device 14 will fall from the container 18 or from its inserted position, since it is fixedly supported by the holder member 16.

It is to be noted that the holder member 16 of the present invention is made of an insulating material with a low dielectric loss and with a high heat resistance. Such material is, for example, a silicone rubber or a synthetic resin such as polypropylene, so that the electric and/or magnetic field produced in the heating cavity is not disturbed by the holder member 16 and so that accurate temperature detection is ensured even when the thermal sensitive member is positioned adjacent the holder member. Furthermore, such material as described above is not poisonous to the human body.

Figure 4A:
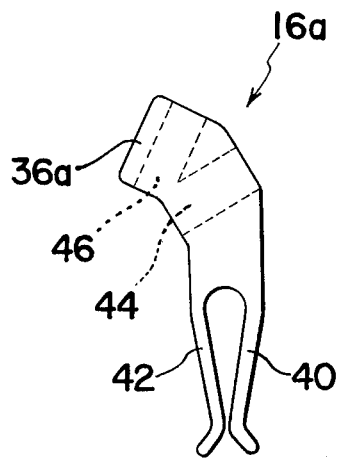
FIGS. 4(a) and 4(b) are similar views to FIGS. 3(a) and 3(b), but particularly showing a modification thereof.
Figure 4B:
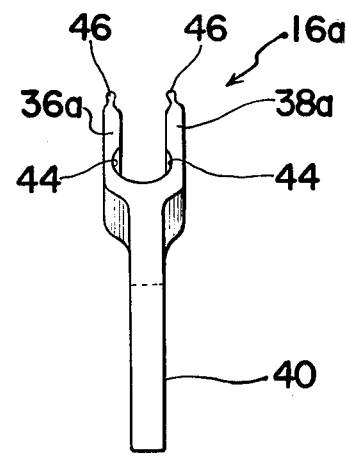

Referring to FIGS. 4(a) and 4(b), there is shown a holder member 16a which is a modification of the holder member 16 shown in FIGS. 3(a) and 3(b). Arm members 36a and 38a provided in this modification are slightly longer than the arm members 36 and 38 described in the previous embodiment and are formed with another pair of opposed curved recesses 46, respectively, in addition to the curved recesses 44. The curved recesses 46 are formed in the arm members 36a and 38a on the surfaces facing each other, so that the temperature detecting device 14 may either be positioned between the pair of recesses 44 or between the pair of recesses 46. As is apparent from FIG. 4(a), the direction in which the pair of recesses 44 extend is slanted further, in a predetermined degree, than the pair of recesses 46, so that the temperature detecting device 14 can either be positioned in a slightly slanted position or in a further slanted position, according to the place where it is desired to position the probe 20.

It should be noted that the arm members described as provided with two pairs of opposed curved recesses may be provided with further pairs of opposed recesses for allowing different slanted angles of the temperature detecting device to be positioned between the arm members.

Figure 5A:
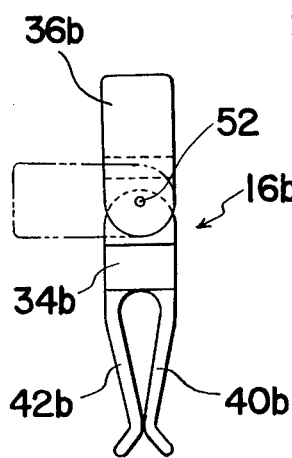
FIGS. 5(a) and 5(b) are similar views to FIGS. 3(a) and 3(b), but particularly showing another modification thereof.
Figure 5B:
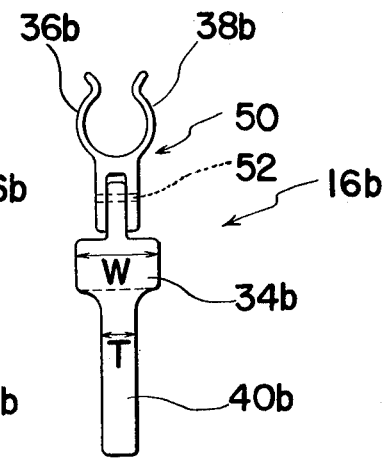

Referring to FIGS. 5(a) and 5(b), there is shown a holder member 16b which is another modification of the holder member 16 shown in FIGS. 3(a) and 3(b). The holder member 16b in this modification comprises a body 34b, the width W of which is wider than the width T of the leg members 40b and 42b, an arm unit 50 pivotally connected to the body 34b by a pin 52, and the leg members 40b and 42b of a type similar to that described above. The arm unit 50, as shown in FIG. 5(b), has arm members 36b and 38b integrally or fixedly formed therewith for holding the temperature detecting device 14.

Since the arm unit 50 is pivotally connected to the body 34a, it is possible to adjust the temperature detecting device in a wider range of angles than possible with the arm members 36a and 36b described above in connection with FIGS. 4(a) and 4(b). Furthermore, the wider width of the body 34 than the leg members 40b and 42b further provides for more stable positioning of the holder member 16b onto the edge of the container.

Figure 6A:
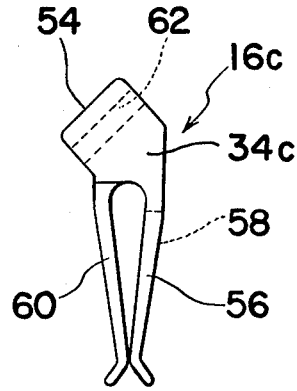
FIGS. 6(a) and 6(b) are similar views to FIGS. 3(a) and 3(b), but particularly showing yet another modification thereof.
Figure 6B:
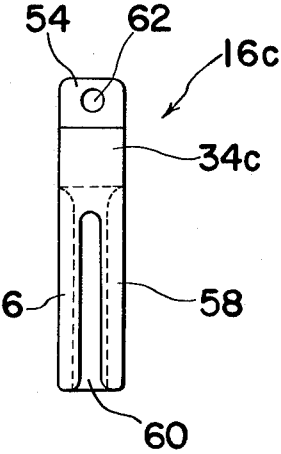

Referring to FIGS. 6(a) and 6(b), there is shown a holder member 16c which is yet another modification of the holder member 16 shown in FIGS. 3(a) and 3(b). The holder member 16c in this modification comprises a body 34c, a holder block 54 which replaces the arm members, and three leg members 56, 58 and 60, instead of two. The holder block 54 has a cylindrical through-hole, an aperture 62, therethrough for inserting therein the support 32 of the temperature detecting device 14. Among three leg members, the leg members 56 and 58, identical to the leg member 42 described above, are in alignment with each other in a spaced relation, while the leg member 60, identical to the leg member 40, is positioned in opposite relation to the leg members 56 and 58, so that the leg members 56 and 58, when positioned on the rim of the container, extend outside the rim of the container while the leg member 60 extends inside the rim of the container. Accordingly, the holder member 16c tightly clamps the rim of the container at three different places.

Figure 7A:
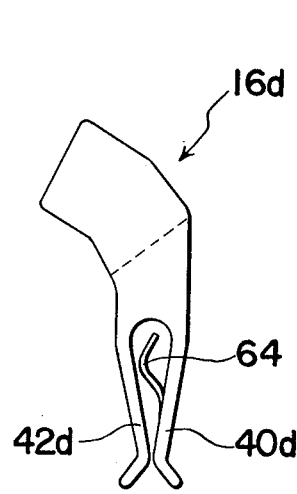
FIGS. 7(a) and 7(b) are similar views to FIGS. 3(a) and 3(b), but particularly showing a further modification thereof.
Figure 7B:
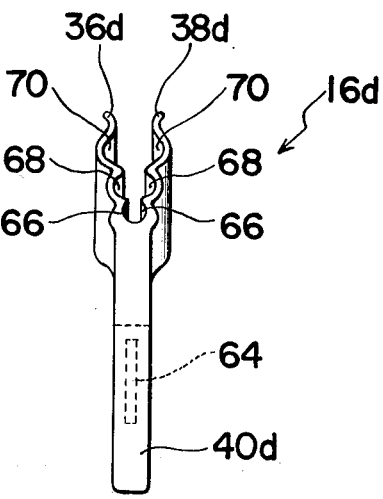
Figure 8:
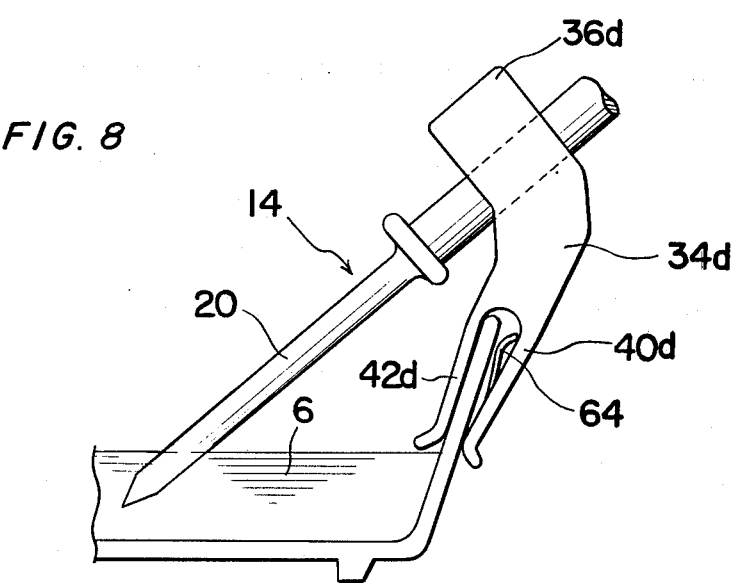
FIG. 8 is a similar view to FIG. 2, but particularly showing another manner in which the temperature detecting device is held onto the container by the holder of other modifications.

Referring to FIGS. 7(a) and 7(b), there is shown a holder member 16d which is a further modification of the holder member 16 shown in FIGS. 3(a) and 3(b). The holder member 16d in this modification comprises a body, arm members 36d and 38d of a type similar to those described above in connection with FIGS. 4(a) and 4(b), leg members 40d and 42d and an auxiliary leg member 64 extending upwardly from the inner surface of the leg member 40d towards the other leg member 42d for forming a narrow space between the auxiliary leg member 64 and the leg member 42d. The elastic auxiliary leg member 64 is made of similar material used for the leg member 40d and is integrally or fixedly formed with the leg member 40d for urging, when positioned onto the rim of the container, the outer surface of the rim, so that the holder member 16d is more tightly clamped onto the rim of the container in a manner as best shown in FIG. 8.

Since the narrow space formed between the auxiliary leg member 64 and the leg member 42d is approximately in alignment with an imaginary line extending between the gravity center of the body and the narrow space formed between the two leg members 40d and 42d, the clamping force exerting on the leg members 40d and 42d and the auxiliary leg member 64 is well balanced for firmly maintaining the holder member 16d in a desired position regardless of shape and size of the container.

Furthermore, since the auxiliary leg member 64 extends from the leg member 40d upwardly and towards a direction away from the leg member 40d, it is comparatively simple to carry out the detachment of the holder member 16d from the container. It is to be noted that the tip end of the auxiliary leg member 64 may be turned towards the leg member 40d for facilitating the removal of the holder member 16d from the container.

Meanwhile, the arm members 36d and 38d in this modification are formed with three pairs of opposed, differently curved recesses 66, 68 and 70. The curvature of the opposed recesses 68 is greater than that of the recesses 70, while the curvature of the curved recesses 66 is further greater than that of the curved recesses 68, so that the arm members 36d and 38d can hold temperature detecting devices 14 of various types with different diameters.

Figure 9A:
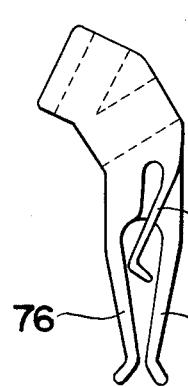
FIGS. 9(a) and 9(b) are similar views to FIGS. 3(a) and 3(b), but particularly showing a still further modification thereof.
Figure 9B:
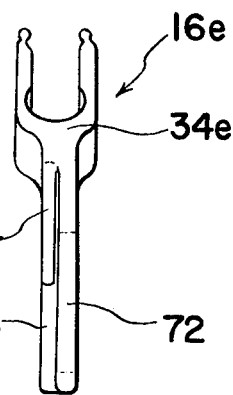

Referring to FIGS. 9(a) and 9(b), there is shown a holder member 16e which is a still further modification of the holder member 16 shown in FIGS. 3(a) and 3(b). The holder member 16e in this modification comprises a body 34e, arm members of a type similar to those described before in connection with FIGS. 4(a) and 4(b), and three leg members 72, 74 and 76. Of the three leg members, the leg member 76 is identical to the leg member 40 described above, while the leg members 72 and 74 are identical to the leg member 42. The joint from which the leg member 74 extends is positioned above, when viewed in FIG. 9(a), the joint from which the leg members 72 and 76 extend, so that the end portion of the leg member 74 stretches towards and is closely adjacent the leg member 76 at an intermediate portion thereof. On the other hand, the leg members 72 and 74 are provided in a manner similar to the leg members 58 and 60 described above in connection with FIGS. 6(a) and 6(b).

For placing the holder member 16e onto the rim of the container, the container is tightly clamped between the two leg members 72 and 76, especially at the end portions where the space therebetween is narrowed, and is also tightly clamped between the leg member 74 and the inner surface of the leg member 76, so that the holder member 16e tightly and firmly holds the container with such simple construction as described above.

It should be noted that the holder member of the present invention may be provided with further leg members and auxiliary leg members other than those described above for improving stability thereof on the rim of the container.

Although the holder member of the present invention includes various types of arm members and leg members, the combination of a particular arm member with a particular leg member is not limited to those combinations described above in connection with various embodiments, but it is possible to take any combinations desired, according to necessity, other than those described above.

Although the present invention has been fully described by way of examples in connection with the preferred embodiments thereof, it is to be noted that various changes and modifications will be apparent to those skilled in the art without departing the scope thereof. Accordingly, the present invention is not to be limited by the embodiments, but such changes and modifications should be construed as included within the scope thereof unless otherwise departing therefrom.

What is claimed is:

1. A probe holder for firmly holding a probe on a container supporting an item being cooked in a microwave oven, said holder comprising:
 a body portion formed of a material having a low dielectric loss;
 arm member means, formed of the same material as said body portion and extending from an upper end thereof, said arm member means comprising at least two arm members resiliently urged toward each other, said two arm members having formed therein a plurality of pairs of opposed, facing recesses, said pairs of recesses being formed in said arm members to extend at different angles; and
 leg member means, extending from a lower second end of said body portion opposite said arm members, for securely fitting said body portion and said arm members to a container, said leg member means comprising at least two leg members resiliently urged toward each other and adapted to be fitted on opposite sides of the container to thereby be urged toward the container.

2. A probe holder as claimed in claim 1, wherein both said arm members and said leg members are integrally formed with said body portion.

3. A probe holder as claimed in claim 1, wherein said recesses in each of said arm members are of different depths, and each of said recesses in one of said arm members is of the same depth as the respective opposite recess in the other said arm member, whereby probes of different diameters can be fitted between the various sized pairs of recesses.

4. A probe holder as claimed in claim 1, wherein said leg members are spaced from each other and extend downward from said body portion toward each other, whereby the leg members are spaced closer to each other at the bottom thereof than at said body portion.

5. A probe holder as claimed in claim 1, wherein said leg members are substantially separated from each other at a joint of said leg members to said body portion and are narrowed towards free end portions of the leg members for firmly clamping a rim of the container between said two leg members substantially at said end portions thereof.

6. A probe holder as claimed in claim 1, wherein said leg members form at least two narrowed spaces for clamping the container in said narrowed spaces.

7. A probe holder as claimed in claim 6, wherein said two narrowed spaces are substantially in alignment with a space formed between said two arm members.

8. A probe holder as claimed in claim 1 further comprising an auxiliary leg member extending from one leg member towards the other leg member for clamping a rim of the container between said auxiliary leg member and said other leg member.

9. A probe holder as claimed in claim 1, wherein said leg members are first, second and third leg members.

10. A probe holder as claimed in claim 9, wherein said first and second leg members extend to form a first narrowed space at free end portions thereof, said third leg member extend towards intermediate of one of said first and second leg members to form a second narrowed space therewith, so as to clamp the rim of the container in said first and second narrowed spaces.

11. A probe holder as claimed in claim 10, wherein said first and second narrowed spaces are in alignment with a space formed between said two arm members.

* * * * *